Jan. 29, 1957  R. F. WILSON ET AL  2,779,702
FUEL CELL SUPPORTING PANEL
Filed July 1, 1953  2 Sheets-Sheet 1
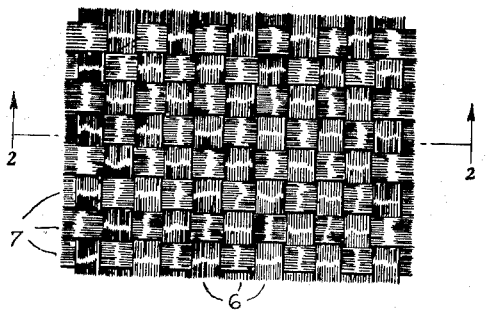
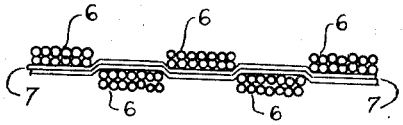
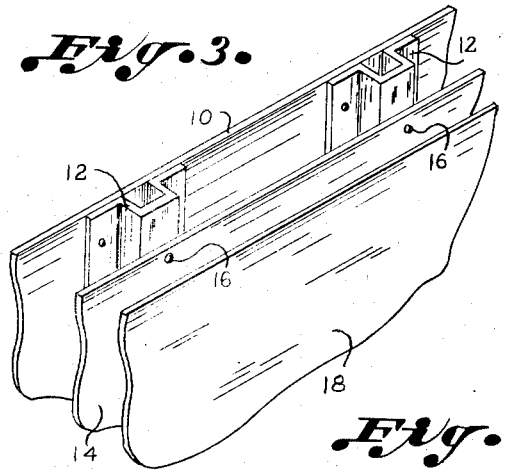
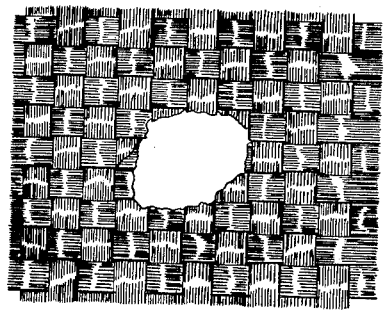
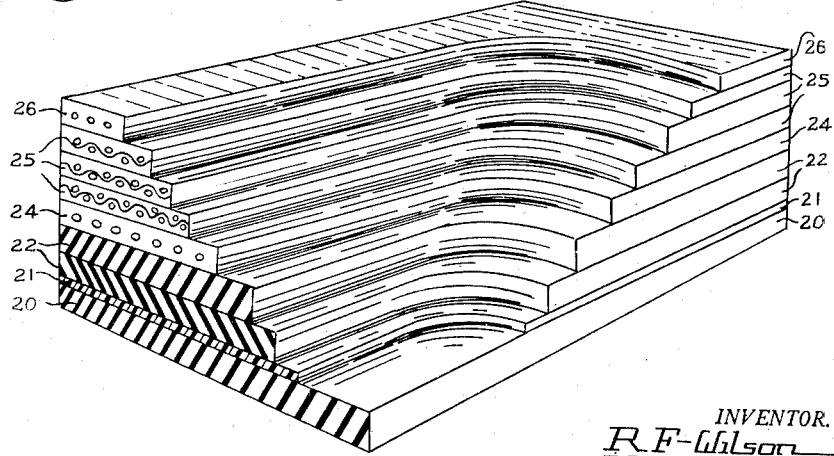
INVENTOR.
R. F. Wilson
V. J. Mattson
BY
W. G. Fraser Jan. 29, 1957 R. F. WILSON ET AL 2,779,702
FUEL CELL SUPPORTING PANEL
Filed July 1, 1953 2 Sheets-Sheet 2

INVENTORS
ROBERT F. WILSON
VIRGIL J. MATTSON
BY
W. A. Fraser
ATTY.

United States Patent Office 2,779,702
Patented Jan. 29, 1957

2,779,702

FUEL CELL SUPPORTING PANEL

Robert Foster Wilson, San Gabriel, and Virgil James Mattson, Hawthorne, Calif., assignors to The Firestone Tire & Rubber Company, Akron, Ohio, a corporation of Ohio Application July 1, 1953, Serial No. 365,415

9 Claims. (Cl. 154—43.5)

This invention relates to novel supporting panels for fuel-, lubricant- and water-containing cells for aircraft, and to a method of making such panels. In one of its more particular aspects, the invention relates to such panels for use in lining cavities in airframes to support flexible fuel cells in such cavities. In another of its aspects, the invention relates to rigid laminae for integral incorporation into the walls of non-metallic fuel cells to render the same self-supporting.

Liquid fuels, lubricants, hydraulic fluids, coolants, water etc. carried in military and other aircraft, and in military surface vehicles such as military automobiles and trucks, torpedo boats, etc., are usually contained in tanks constructed largely of elastomeric materials reinforced with fabric cords. These tanks may be arranged to be self-sealing after being perforated with bullets, shrapnel etc., and in such cases usually consist of an innermost elastomeric ply which is resistant to the action of the liquid contained in the cell, and a sealant layer which is swollen by the liquid contained in the cell. Upon perforation of the cell wall by a bullet or the like, the contents seep out and cause the sealant layer to swell and close the wound. Hereinafter such cells, whether or not of the self-sealing type, and regardless of the nature of the liquid (fuel, lubricant, water or the like) actually contained therein, will be designated "fuel cells."

The elastomeric materials of the walls of such cells are not sufficiently rigid to be self-supporting, and accordingly panels of rigid sheet material must be provided to support them. Either (A) the cavity of the aircraft or other vehicle into which the fuel cell is introduced is lined with a suitable rigid paneling material to support the fuel cell in place or (B) the panel forms a lamina of the fuel cell itself and is integrally built thereinto. It is to the former type of paneling (A) that the present invention chiefly relates, although paneling in accordance with this invention may advantageously be incorporated as integral stiffening plies into self-supporting fuel cells.

The mechanical properties, and more particularly the ballistic properties, of fuel cell supporting panels are subject to rather severe requirements. The paneling must first of all be light in weight; a maximum of 0.5 pounds per square inch is about all that can be tolerated. As to mechanical and ballistic properties, the paneling must be strong enough to support a fuel cell and withstand, without widespread fracture, the shock of the passage of a bullet therethrough and the surge of the liquid from the tank. A number of materials have been tried for the purpose, but none of them have been very satisfactory. For instance, conventional glass-cloth-polyester-resin laminates (consisting of several plies of glass cloth, usually with a thread count of 30 or more in each direction, impregnated and bonded together by a polyester resin) split to a considerable distance away from the actual hole produced by the passage of a bullet therethrough. Likewise the resin "powders off" over a considerable area surrounding the bullet hole. As a result of these two defects, the support provided by the panel in the vicinity of the wound is insufficient to enable the self-sealing action of self-sealing type fuel cells to become effective; the lips of the wound are not held in alignment, and hence do not seal. In the case of non-self-sealing fuel cells, this failure of support is likewise a serious disadvantage, since the fuel cell may rupture or chafe at the unsupported area. Somewhat similar laminates of nylon cloth coated with nylon have also been tried. These do not split or "powder off" the resin, but they have the defect of becoming permanently stretched and bellied out over a considerable area surrounding the bullet wound and again fail to provide sufficient support to enable the fuel cell to heal. The nylon laminates have the further disadvantage of warping and losing their body with changes in humidity. Besides supporting the fuel cell, the panels are also called upon to serve another function, namely to prevent the flowered-out portions of the aircraft skin from reaching into the wound in the fuel cell and propping the same open so as to interfere with the self-sealing of the fuel cell. In order to provide sufficient strength for this purpose, the ordinary glass and nylon laminates referred to above must be made relatively heavy and thick. This is disadvantageous, both because of the excessive weight required in many cases, and also because of the added expense involved in building up the laminated fabric.

Accordingly it is an object of this invention to provide novel and superior aircraft fuel cell supporting panels.

Another object is to provide such panels in which the damage occasioned by a gunfire wound will be confined very closely to the immediate area of the perforation of the panel by the projectile.

A further object is to provide such a panel which will be sufficiently strong to support the fuel cell and to withstand the shock of the passage of projectiles and the consequent surge of fuel or other liquid contents of the cell supported thereby.

Another object is to provide such a panel which will prevent the petalling out of the airframe from interfering with the self-sealing action of the fuel cell.

A still further object is to provide such a supporting panel which will be constructed of a single ply and which will not require the fabrication and uniting together of a plurality of plies of fabric material and plastic.

A still further object is to provide such a panel which will be low in cost.

A further object is to provide such a panel which will not delaminate or tear when pierced by gunfire.

Still another object is to provide a supporting panel which combines the qualifications set out above with the further advantage of lightness in weight.

The invention will be described in connection with the accompanying drawings wherein:

Fig. 1 is a view looking down vertically upon the surface of a glass fabric suitable for use in this invention. This figure is on a scale of 1.3:1 such that the fabric will appear on approximately full scale on the final lithographed patent drawing;

Fig. 2 is a section, slightly enlarged, on the line 2—2 of Fig. 1;

Fig. 3 shows a portion of an airframe providing a fuel cell cavity lined with supporting panels of this invention;

Fig. 4 is a view of a fuel cell wall containing, as an integral lamina thereof, a supporting panel in accordance with this invention;

Fig. 5 is a drawing copied from a photograph of a gunfire wound produced in a test conducted upon a supporting panel in accordance with this invention.

SYNOPSIS OF THE INVENTION

Figure 6:
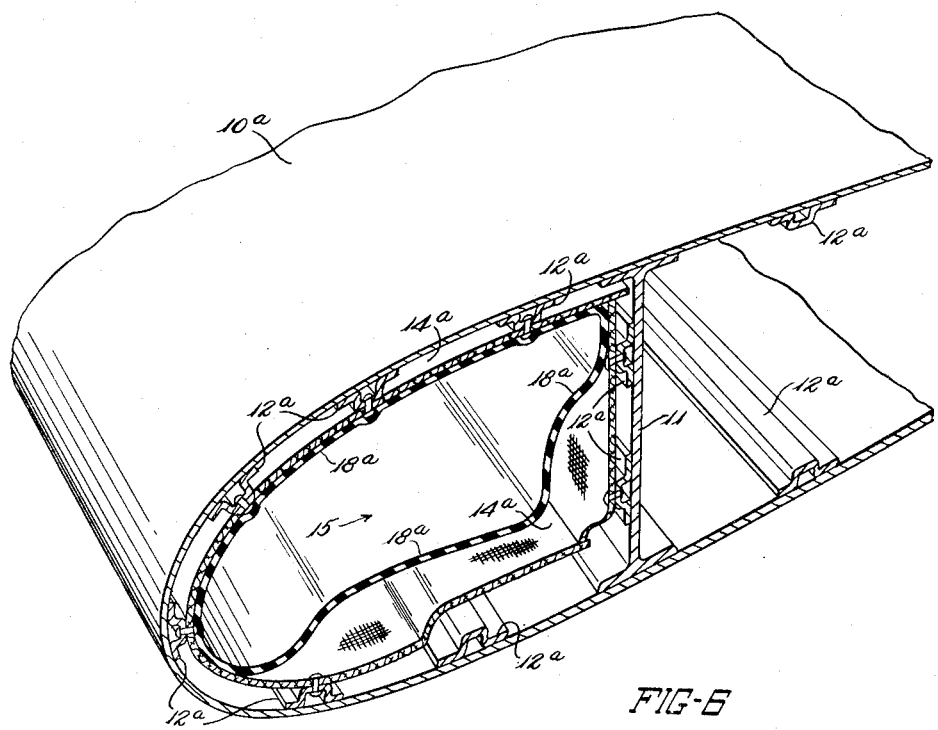
Fig. 6 is a perspective view, partially sectioned, of an aircraft wing embodying the construction of Fig. 3 and providing a fuel cell cavity containing a fuel cell.

The above and other objects are secured, in accordance with this invention, in an aircraft fuel cell supporting panel comprising a relatively coarse woven glass fabric impregnated with a hard resin. The fabric is woven from relatively coarse untwisted bundles of glass filaments in an extremely coarse weave having a thread count of 1 to 10 threads per inch in each direction and is more particularly described hereinbelow. In accordance with the invention, the fabric is impregnated with a liquid resin-forming material which is thereafter hardened by the use of heat, light, catalysts or other suitable agents, thereby rigidifying the fabric into a strong, hard, rigid panel. The resultant panel is used to line the interior of the cavity within an airframe which is to contain a fuel cell, and serves as a strong and reliable support therefor. When perforated by gunfire, a panel fabricated as just described is fractured only in the immediate vicinity of the wound and withstands, without substantial damage, the surge of the fuel upon penetration by the projectile. The panel is also strong enough to arrest the petalling of the airframe skin and avoids any interference by this petalling with the self-sealing action of the fuel cell, if the cell is of the self-sealing type.

The invention was described above largely on the assumption that the supporting panels will be used in aircraft; however, the panels may also be used for the support of fuel cells in military trucks, military automobiles, tanks, torpedo boats and the like. Also the description was largely on the basis that the panels will be used as supporting liners for fuel-cell-containing cavities in airframes. However, the panels may be built into fuel cells as integral stiffening plies. Likewise the assumption was made that only a single layer of the fabric will be used in the panel, and this is by far the preferred embodiment and appears to provide superior ballistic properties; however, if desired for special applications, two or more layers of the fabric may be impregnated and laminated together with the resin to provide a laminate.

THE GLASS FABRIC FORMING THE BASIS OF THE SUPPORTING PANELS OF THIS INVENTION

Conventional glass fabrics used for impregnation with resins to form laminates etc. are usually woven from relatively fine twisted threads of glass fibers containing, say, a multiple of from 2 to 5 times the basic glass fiber roving, which commercially is supplied in the form of rovings containing 204 separate filaments; thus the conventional thread as woven will generally contain from 204 to 1010 separate glass filaments and will have a considerable degree of twist. The ultimate filaments of glass fiber will usually have individual diameters of .0002 to .0010 inch. By way of contrast, the coarse bundles from which the fabric employed in the present invention are woven are vastly coarser than this, usually containing from 30 to 100 of the elementary commercial rovings of 204 individual filaments—i. e. they will contain from about 6,000 to 20,000 individual glass filaments. Expressed otherwise (in line with the usual textile practice of specifying glass fiber thread weight as the number of yards per pound) the coarse bundles employed in the present invention will usually have a yardage of 100–500 yards per pound. The word "bundles" will be used hereafter to designate these coarse, untwisted, assemblies of glass filaments containing 6,000–20,000 individual filaments and having a yardage of 100–500 yards per pound.

The weave of the fabric employed in this invention is also far coarser than is customary in glass fabrics. In general the thread count (i. e. the number of bundles in the warp or filling, as the case may be, per inch) will range from 1 to 10 threads per inch in each direction. With these thread counts, and with the weight of glass fiber bundles specified above, the bundles in the fabric will assume an oval flattened cross section with the long diameter of the oval parallel to the general surface of the fabric. The ratio of the diameters of the oval cross sections will generally range 1:16 to 3:16. As to the pattern of weave employed, this may be any of a variety of weaves, plain cloth weave or "square weave" being preferred as providing the best behavior during impregnation and the best all-around performance in the final panel materials.

The preferred plain square-woven fabric is shown in Figs. 1 and 2 as comprising warp threads or bundles 6 directed alternately over and under filling threads or bundles 7. As will be seen in Fig. 2, the warp bundles 6, since they are untwisted and are in a rather coarse weave, are flattened and oval in cross section. The same is also true of the filling, although this is not shown in the drawing. In some cases it may be preferred, in order to provide a certain fullness and openness in the cloth, to use a more complicated weave in which a plurality of warps and/or a plurality of fillings are used; for instance, a simple basket weave of two warps and two fillings might be used. Square woven fabrics of this design have been found to behave particularly well in the process of impregnating, in which process they withstand the handling, bending, squeezing etc. without displacement of the coarse glass fiber bundles from their proper positions. Likewise, panels produced from these fabrics behave exceptionally well in gunfire and other performance tests conducted thereon.

THE RESINS USED TO IMPREGNATE THE GLASS FABRIC

A wide variety of resins may be used to impregnate the glass fabrics in order to produce the rigid paneling of this invention, the principal requirement being that the resin shall be capable of application in liquid form, and of being subsequently hardened. Preferably the liquid form should contain as little as possible or no constituents other than the materials which shall form the ultimate resin—i. e. it is best to avoid the use of solvents as far as possible, and the resin upon hardening should preferably lose no volatile constituents as these may result in voids in the impregnated fabric. Suitable resins include for instance liquid phenolic resins, preferably of the casting type—i. e. those that cure upon heating without any evolution of gases. Other types of resins include the diunsaturated allyl type esters, e. g. di-allyl esters of dicarboxylic organic radicals such as di-allyl esters of partial carbonic esters of glycols. Preferably, however, the allyl type esters will be those containing additional unsaturation of some type other than the allyl so that partial polymerization may be effected before impregnation, and the polymerization completed subsequently. Other resins include the epoxy resins, which are condensates of epichlorohydrin and the like with bis-phenol A and the like. Preferred at present however, for considerations of performance and of present commercial availability, are the polyester resins which are blends of relatively low molecular weight, sub-resinous unsaturated poly-esters with monomeric styrene. In the uncured form, these resins have the desired fluidity and impregnating properties and harden at the desired rate upon treatment with peroxidic catalysts, heat, light or combinations of these factors. The cured resins have the necessary high strength for the panels of this invention and seem to provide, in combination with particular glass fiber fabrics described above, the desired mechanical, and particularly the desired ballistic, properties necessary in fuel cell supporting panels.

As to the manner and extent of the impregnation of the fabric with the resin, this may be accomplished any way customary in the art. For instance, the fabric may be hung up vertically, and the resin applied by means of a brush, spray- or flow-gun or the like. A method which the present applicants have found to be particularly effective involves first passing the fabric between squeeze rollers to compress the fabric and remove as much as possible of the air from the interstices of the fabric and thereafter passing the fabric as directly as possible into a vat containing the liquid resin composition. The fabric is then removed from the vat and squeezed through further squeeze rolls to remove excess resin. The amount of resin can be adjusted at this point by varying the pressure of the rolls, greater pressure resulting in less pick-up and vice versa, less pressure resulting in greater pick-up of resin in the fabric.

The amount of resin incorporated in the fabric in the impregnating process will vary depending upon the purpose for which the ultimate panel is to be used. In accordance with Government specification MIL–P–8045, fuel cell supporting panels may be divided into three types:

*Type 1.*—Very hard and stiff paneling adapted to be simply inserted into the fuel cell cavity of an airframe between the airframe stiffening ribs and the fuel cell without providing any great degree of attachment between the airframe and the panel. For this type of panel the resin pick-up should be between 20 and 50%, based on the weight of the glass fiber fabric in the panel.

*Type 2.*—Relatively soft and flexible paneling material requiring substantially continuous support which is usually provided by a sheet of metal directly in contact with the side of the panel away from the fuel cell. For this type of panel the resin pick-up should be approximately 1%–50%, based on the weight of glass fiber fabric in the panel.

*Type 3.*—A paneling material of intermediate hardness and stiffness adapted to be secured to the interior of the fuel cell cavity of an airframe with intermittent support, e. g., by means of rivets or screws around the edges of the panels and at intervals along the ribs of the aircraft frame. For this type of panel, the resin pick-up should be approximately 10%–50%, based on the weight of glass fiber fabric in the panel.

TYPICAL INSTALLATIONS ACCORDING TO THIS INVENTION

Fig. 3 shows a typical installation of a panel of Type 3 noted above. In Fig. 3 there is shown the exterior aluminum alloy skin 10 of an airframe, to which are riveted aluminum alloy hat-sections 12 as stiffening members. The side of the aluminum sheet 10 to which the hat sections are attached is on the interior of an aircraft and forms a portion of the wall thereof defining a fuel cell cavity. A panel 14 of Type 3 backing material, prepared in accordance with this invention, is attached to these hat sections by means of button-type head sheet metal screws 16 which provide intermittent attachment for the backing material 14. A fuel cell is cradled within the cavity, its cell wall 18 being shown in the drawing as lying against the backing panel 14. Type 1 panel installation would be very similar to that of Fig. 3 except that the screws 16 would be omitted, and the panel simply laid in place and held there by the pressure of the fuel cell.

Fig. 6 shows an installation in a wing fuel cell cavity of the construction shown in detail in Fig. 3, the parts being numbered correspondingly to the parts in Fig. 3 except that they are suffixed with the letter "a." As shown in Fig. 6, the construction comprises an aircraft wing section comprising a wing skin 10a and wing spar beam section 11, the skin 10a and spar 11 together defining a fuel cell cavity. Secured to the wing skin 10a and spar 11 are stiffening hat sections 12a. Panel material 14a of type 3 backing material, prepared in accordance with this invention, is attached to these hat sections by means of sheet metal screws 16a which provide intermittent attachment for the backing material 14a. A fuel cell indicated generally at 15 is cradled within the cavity, its cell wall 18a lying against the backing panelling 14a so as to be supported thereby.

Fig. 4 shows a portion of a self-sealing, self-supporting fuel cell wall having panels produced in accordance with this invention incorporated therein as integral stiffening plies. As shown, the wall consists of a plurality of laminae, all adhered together as a unitary whole, as follows:

Table 1

| Lamina | Reference Characters in Fig. 4 |
|---|---|
| Vulcanized, fuel-resistant GR-A synthetic rubber innermost lamina, in contact with the fuel in the cell | 20 |
| Nylon diffusion barrier | 21 |
| Semi-vulcanized, fuel-swellable rubber composition sealant (2 plies) | 22 |
| Vulcanized rubber-impregnated square woven cotton fabric ply | 24 |
| Resin-impregnated glass fiber fabric stiffening panels prepared as described in the example below (3 plies) | 25 |
| Vulcanized, fuel resistant GR-A synthetic rubber impregnated square woven fabric outside ply | 26 |

With the foregoing general discussion in mind, there is given herewith a detailed specific example of the practice of this invention; all parts given are by weight.

EXAMPLE

A. *The glass fiber fabric employed*

The coarse bundles of glass fibers which were woven into the fabric used in this example consisted of 60 commercial "rovings" of glass filaments. Each roving contained 204 individual glass fibers and each of these glass fibers had individual diameters varying over the range, .00023 to .00075 inch. The bundles as a whole each contained 60 x 204=12,240 individual filaments and had a yardage of 108 yards per pound.

The bundles were woven into a fabric in accordance with the simple plain cloth or square woven pattern of Fig. 1, with a thread count of 6 warp threads or bundles to the inch and 8 filling threads or bundles to the inch. The completed fabric had a thickness of .06 inch, a weight of 36 ounces per square yard. The tensile strength of the fabric was 936 pounds per inch in the warp direction and 1148 pounds per inch in the filling direction.

B. *Impregnation and curing of the fabric*

| | Parts |
|---|---|
| Liquid polyester resin | 100 |
| ("Marco MR28C," a solution of, by weight, 35% monomeric styrene and 65% of a sub-resinous polyester of maleic acid, glycol and phthalic acid: manufactured by Marco Chemicals Inc.) | |
| Catalyst | 4 |
| ("Lupersol DDM," a solution of, by weight, 65% methyl ethyl ketone peroxide and 35% dimethyl phthalate: manufactured by Novadel Azene Corp.) | |
| Methanol | 3 |

The above ingredients were stirred together to form an impregnating solution shortly before use and placed in an impregnating vat provided with a pair of wringer rolls in the bottom thereof. The glass fiber fabric woven as above described was passed down into the vat and through the wringer rolls to compress the same and expel as much as possible of the air from the interstices of the fabric. Upon leaving the wringer rolls the fabric imbibed the impregnating solution. The fabric was then removed from the vat, passed between rollers to remove the excess impregnating solution and hung in an oven maintained at 110° C. for one hour. In the oven the sheet hung vertically out of contact with the oven walls or any other obstructions. The sheet was then cooled and removed. There resulted a strong, stiff panel material with a weight of .42 to .50 pound per square foot. The panel material contained approximately 40% of resin, based on the weight of glass fiber fabric in the panel.

C. *Gunfire testing*

Panels of the resin-impregnated fabric prepared as above described were subjected to gunfire tests in accordance with Government specification MIL–T–5578–A. For this test there was provided an aluminum enclosure corresponding to the supporting enclosure provided for fuel cells in aircraft. This enclosure comprised walls of ⅛ inch aircraft aluminum sheet having riveted on the interior thereof 1½ inch hat sections of .064 inch thick aircraft aluminum sheet on 6-inch centers so as to space the fuel cell from the wall. The dimensions of this cell were such as to contain therein a 2½ foot by 2½ foot by 2 foot self-sealing aircraft fuel cell. Panels cut from the impregnated glass filament fabric-resin sheets were placed between cell wall and hat sections without being attached to the structure. This cell was filled three quarters full of nonaromatic test fuel.

The structure was then shot-tested in accordance with the Government specification MIL-T-5578-A, the range being 25 yards; with and without interposition of a tumble board; at 78° F. and at −40° F.; with 50 caliber armor piercing ammunition and 20 millimeter practice ammunition in accordance with the cited Government specification. Following is a summary of the results:

*Table II*

| Temp. of Cell at Firing (° F.) | Ammunition | Round No. | Tumble of Projectiles | | Size of Wound in Backing (inches) | Fuel Head at Wound (inches) | Leakage | |
|---|---|---|---|---|---|---|---|---|
| | | | Extent | Angle (o'clock) | | | Immediate | Two Minutes After Shot |
| 78 | 50 caliber | 1-Entry | full | 11:00 | 2⅜ x 1¼ | 6 | seep | damp. |
| | | 2-Entry | 0 | | ½ | 12 | dry | dry. |
| | | 2-Exit | full | 10:00 | 2¼ x 1¼ | 10 | dry | dry. |
| | | 3-Entry | full | 10:30 | 2¼ x 1¼ | 6 | seep | dry. |
| | | 4-Entry | full | 10:30 | 2⅜ x 1¼ | 11 | dry | dry. |
| | 20 mm | 5-Entry | 0 | | ¾ | 9 | dry | dry. |
| | | 5-Exit | full | 9:00 | 3 x 1¼ | 7 | seep | dry. |
| | 50 caliber | 6-Entry | full | 6:30 | 2⅜ x 1¼ | 5 | dry | dry. |
| | | 7-Entry | full | 7:00 | 2 x 1 | 12 | dry | dry. |
| −46 | 20 mm | 8-Entry | 0 | | ¾ | 9 | dry | dry. |
| | | 8-Exit | full | 10:00 | 3 x 1½ | 5 | seep | dry. |
| | | 9-Entry | 0 | | ¾ | 9 | dry | dry. |
| | | 9-Exit | full | 11:00 | 3¼ x 1¼ | 4 | seep | dry. |
| | 50 caliber | 10-Entry | full | 9:00 | 2⅛ x 1⅛ | 5 | dry | dry. |
| | | 11-Entry | full | 12:00 | 2 x 1¼ | 12 | dry | dry. |

It will be seen that excellent performance was had from the fuel cell in the above test, which would not have been possible unless good support were furnished at all the wounds by the panels of this invention.

At the conclusion of the test the panels were removed from the test cell and inspected. In all cases it was found that damage to the panels was closely confined to the immediate area of impact of the projectiles, the impregnated fabric remaining stiff and undistorted practically up to the edge of the wound. Fig. 5 is taken from a photograph of a typical wound and illustrates the performance just cited.

From the foregoing general discussion and detailed specific example, it will be evident that this invention provides novel fuel cell paneling materials having excellent performance under gunfire. The paneling materials of this invention are dimensionally stable over long periods of time. The panels are made by a relatively simple and inexpensive process from the readily available glass filament and polyester and similar resins.

What is claimed is:

1. A supporting panel for a fuel cell comprising a glass filament fabric impregnated with a hard resin, said glass filament fabric being woven with a thread count of 1 to 10 threads per inch in each direction, from flattened, twist-free bundles of glass filaments, said filaments having a filament diameter of .0002–.0010 inch, and said bundles having a yardage of 100–500 yards per pound.

2. A backing panel for a self-sealing aircraft fuel cell comprising a single layer of a glass filament fabric impregnated with a hard resin, said glass filament fabric being woven with a thread count of 1 to 10 threads per inch in each direction, from flattened, twist-free bundles of glass filaments, said filaments having a filament diameter of .0002–.0010 inch, and said bundles having a yardage of 100–500 yards per pound.

3. A supporting panel for a self-sealing aircraft fuel cell comprising a glass filament fabric impregnated with a hard resin, said glass filament fabric being woven in a square weave with a thread count of 1 to 10 threads per inch in each direction, from flattened, twist-free bundles of glass filaments, said filaments having a filament diameter of .0002–.0010 inch, said bundles having a yardage of 100–500 yards per pound, and said resin being a cured copolymer of an unsaturated polyester and styrene.

4. A stiffening ply for a self-supporting, self-sealing aircraft fuel cell comprising a glass filament fabric impregnated with a hard resin, said glass filament fabric being woven with a thread count of 1 to 10 threads per inch in each direction, from flattened, twist-free bundles of glass filaments, said filaments having a filament diameter of .0002–.0010 inch, and said bundles having a yardage of 100–500 yards per pound.

5. A self-supporting, self-sealing non-metallic type aircraft fuel cell comprising a plurality of laminae built up into a fuel-containing enclosure; said laminae including an elastomeric fuel resistant lamina on the interior of the enclosure and, disposed externally of the fuel resistant lamina, an elastomeric fuel-swellable sealant lamina and a stiffening ply comprising a glass filament fabric impregnated with a hard resin, said glass filament fabric being woven with a thread count of 1 to 10 threads per inch in each direction, from flattened, twist-free bundles of glass filaments, said filaments having a filament diameter of .0002–.0010 inch, and said bundles having a yardage of 100–500 yards per pound.

6. A self-supporting, self-sealing non-metallic type aircraft fuel cell comprising a plurality of laminae built up into a fuel-containing enclosure; said laminae including an elastomeric fuel resistant lamina on the interior of the enclosure and, disposed externally of the fuel resistant lamina, an elastomeric fuel-swellable sealant lamina and a stiffening ply comprising a glass filament fabric impregnated with a hard resin, said glass filament fabric being woven in a square weave with a thread count of 1 to 10 threads per inch in each direction, from flattened, twist-free bundles of glass filaments, said filaments having a filament diameter of .0002–.0010 inch, said bundles having a yardage of 100–500 yards per pound, and said resin being a cured copolymer of an unsaturated polyester and styrene.

7. A supporting panel for an aircraft fuel cell, comprising a single layer of a glass filament fabric impregnated with a hard resin, said glass fabric being woven with a thread count of 1 to 10 threads per inch in each direction, from flattened, twist-free bundles of glass filaments, said filaments having a filament diameter of .0002–

.0010 inch, and said bundles having a yardage of 100–500 yards per pound.

8. A supporting panel for an aircraft fuel cell, comprising a single layer of a glass filament fabric impregnated with a cured polyester resin, said glass fabric being woven with a thread count of 1 to 10 threads per inch in each direction, from flattened, twist-free bundles of glass filaments, said filaments having a filament diameter of .0002–.0010 inch, and said bundles having a yardage of 100–500 yards per pound.

9. A stiffening ply for a self-supporting, self-sealing aircraft fuel cell comprising a single ply of a glass filament fabric impregnated with a hard resin, said glass filament fabric being woven with a thread count of 1 to 10 threads per inch in each direction, from flattened, twist-free bundles of glass filaments, said filaments having a filament diameter of .0002–.0010 inch, and said bundles having a yardage of 100–500 yards per pound.

References Cited in the file of this patent

UNITED STATES PATENTS

| Number | Name | Date |
|---|---|---|
| 2,184,326 | Thomas | Dec. 26, 1939 |
| 2,204,859 | Hyatt et al. | June 18, 1940 |
| 2,243,432 | Mautner | May 27, 1941 |
| 2,397,184 | Klose | Mar. 26, 1946 |
| 2,429,688 | Hoover | Oct. 28, 1947 |
| 2,439,562 | Cunningham | Apr. 13, 1948 |
| 2,446,815 | Davies et al. | Aug. 10, 1948 |
| 2,508,906 | Cunningham et al. | May 23, 1950 |
| 2,519,393 | Noyes | Aug. 22, 1950 |
| 2,521,055 | Foster | Sept. 5, 1950 |
| 2,539,301 | Foster | Jan. 23, 1951 |
| 2,562,951 | Rose et al. | Aug. 7, 1951 |
| 2,602,037 | Nelb | July 1, 1952 |
| 2,619,705 | Foster | Dec. 2, 1952 |
| 2,735,635 | Hoffman | Feb. 21, 1956 |

FOREIGN PATENTS

| Number | Country | Date |
|---|---|---|
| 423,060 | Great Britain | Jan. 24, 1935 |
| 555,984 | Great Britain | Sept. 15, 1943 |